(12) United States Patent
Vermoortele et al.

(10) Patent No.: US 6,261,354 B1
(45) Date of Patent: Jul. 17, 2001

(54) PIGMENTARY AZO COMPOSITION, PREPARATION METHOD AND USE

(75) Inventors: Frank Vermoortele, Lille; Jean Mayer, Hem, both of (FR)

(73) Assignee: Gebroeders Cappelle Naamloze, Vennootschap (BE)

( * ) Notice: Subject to any disclaimer, the term of this patent is extended or adjusted under 35 U.S.C. 154(b) by 0 days.

(21) Appl. No.: 09/331,929

(22) PCT Filed: May 12, 1998

(86) PCT No.: PCT/BE98/00066

§ 371 Date: Jun. 29, 1999

§ 102(e) Date: Jun. 29, 1999

(87) PCT Pub. No.: WO98/58026

PCT Pub. Date: Dec. 23, 1998

(30) Foreign Application Priority Data

Jun. 17, 1997 (BE) ................................................ 09700521

(51) Int. Cl.⁷ ............................ C09D 11/00; C09B 27/00
(52) U.S. Cl. ............................................. 106/31.8; 106/496
(58) Field of Search ..................................... 106/31.8, 496

(56) References Cited

U.S. PATENT DOCUMENTS

| | | | |
|---|---|---|---|
| 3,446,640 | 5/1969 | Orlova et al. ........................ | 106/494 |
| 3,725,101 | 4/1973 | Kuhne et al. ........................ | 106/494 |
| 4,251,441 | * 2/1981 | Frolich et al. ...................... | 106/31.8 |
| 4,301,049 | * 11/1981 | Funatsu et al. ..................... | 524/190 |
| 4,457,783 | 7/1984 | Hamilton et al. .................... | 106/494 |
| 4,474,609 | * 10/1984 | Ehl et al. .............................. | 106/494 |
| 5,024,698 | * 6/1991 | Schwartz et al. .................... | 106/31.8 |
| 5,151,129 | * 9/1992 | Morrison et al. ..................... | 106/31.8 |

FOREIGN PATENT DOCUMENTS

| | | | |
|---|---|---|---|
| 0 079 303 A2 | 10/1982 | (EP) | C09B/67/22 |
| 0 079 303 B1 | 10/1982 | (EP) | C09B/67/22 |
| 2 220 440 | 11/1974 | (FR) | C09B/29/32 |
| 2 275 533 | 1/1976 | (FR) | C09B/43/00 |
| 2 394 584 | 1/1979 | (FR) | C09B/29/32 |
| 1 348 509 | 3/1974 | (GB) | C09B/29/00 |
| 1 428 633 | 3/1976 | (GB) | C09B/29/32 |

OTHER PUBLICATIONS

Dongzhi, Liu and Ren Shengwu; *An Investigation into the Synergism of Monoazoacetoacetanilide Pigments: Dyes and Pigments*; 1992; pp. 69–80.

PCT Rapport de Recherche Internationale for PCT/BE 98/00066 dated Aug. 26, 1998.

Rapport D'Examen Preliminaire International for PCT/BE98/00066 dated Feb. 26, 1999.

International Preliminary Examination Report (translation), dated May 12, 1988 for application No. PCT/BE98/00066.

Document No. XP–002057434 405 382 A Aug. 1975 Soviet Union.

* cited by examiner

*Primary Examiner*—Helene Klemanski
(74) *Attorney, Agent, or Firm*—Sheridan Ross P.C.

(57) ABSTRACT

The present invention is directed to a transparent pigmentary composition for use as a colorant in printing inks. The composition is manufactured by coupling a mixture of diazonium salts obtained from about 98 to about 85% in moles of 2-methoxy-4-nitroaniline and about 2 to about 15% in moles of 4-chloro-2-nitroaniline with acetylaceto-2-anisidide.

13 Claims, No Drawings

PIGMENTARY AZO COMPOSITION, PREPARATION METHOD AND USE

SUBJECT OF THE INVENTION

The present invention relates to a new pigmentary azo composition of the modified Pigment Yellow 74 type, the process for its preparation by "in admixture synthesis", and its uses.

TECHNOLOGICAL BACKGROUND ON WHICH THE INVENTION IS BASED

Production techniques for colouring agents and pigments by diazo-coupling reaction are well known, and a large number of pigments has been obtained in this manner.

The pigment listed in the Color Index as Pigment Yellow 74 is obtained by diazotizing of 2-methoxy-4-nitro-aniline (PNOA) and coupling with acetylaceto-2-anisidide (AAOA). This is a very greenish yellow pigment, which is widely used in the paints and printing inks industry.

PY 74 is found commercially in two forms, one transparent and of high colouring power, the other opaque and of lower colouring power, used mainly in paints, where covering properties are very sought after.

According to document EP 0079303 A, the transparent form is obtained by heating after coupling at 70° C. and immediate filtration. The opaque form results from the same coupling reaction and the heating of the reaction mixture to boiling point for one hour before filtration. It is specified that the difference in the colouring power results from the difference in the crystalline dimensions rather than from different crystalline forms.

The purpose of this document is to improve the opaque form of PY 74 in order to overcome the problem linked to the loss of colouring power on storage by tinting (chemical modification) the PY 74 with 1 to 20%, and preferably 2.5 to 7%, of another mono-azo yellow pigment based on acetylaceto-2-anisidide.

The document mentions that the mixture can be obtained:

by mixing the two constituents while dry, by mixing the filter cakes of the two pigments, followed by drying, by diazotizing of a mixture of the respective aminated precursors (anilines), followed by coupling, boiling, filtration and standard drying, by separate diazotizing of the two precursors, followed by a mixture of the two diazotized compound solutions, coupling, boiling, filtration and drying, by diazotizing and coupling of the precursors in separate operations and mixing the aqueous sludges, followed by standard boiling, filtration and drying operations or also by diazotizing and coupling of one of the precursors followed by separate diazotizing of the second precursor and coupling in the presence of the first pigment followed by standard boiling, filtration and drying operations.

The tinting compound is obtained from one or more amines of formula $(R_1)_m$—$(R_2)_n$—$C_6H_4$—$NH_2$ (m+n≦3), where $R_1$, $R_2$ represent alkyl, alkoxy, halogen (in particular chlorine) or nitro groups.

The 4-nitro-2-amino-anisole, 4-methyl-2-nitro-aniline, 2-methyl-5-nitro-aniline and 3-nitro-4-amino-anisole amines are described as being particularly useful as precursors.

In document FR 2394584 A, a mixture constituted by 75 to 85% by weight of PY 74 and 25 to 15% by weight of a pigment identified in the color index as pigment yellow 65 (PY 65) is claimed.

The mixture can be obtained by a process characterized in that 0.75 to 0.85 molar equivalent of 5-nitro-2-amino-anisole and 0.25 to 0.15 molar equivalent of 3-nitro-4-amino-anisole are diazotized, and the diazo compounds are coupled with acetylaceto-amino-2-anisole (referred to as mixed coupling). It is indicated however that the mixture can be achieved by an intimate mixture of the constituents in the ratio indicated.

It is indicated that these mixtures constitute a yellow verging more on the red than PY 74. They both have a tinctorial power and a tint very similar to those of pigment yellow 12 (PY 12) used on a large scale in the printing industry, but they are distinguished by a much improved fastness to light as well as a higher transparency, a stronger gloss and good fluidity in binding systems. These mixtures are superior to equivalent mixtures obtained using 3-nitro-4-amino-anisole and 4-chloro-2-nitro-aniline as diazotizing components.

Various uses for dying, printing paper and synthetic materials, in the preparation of printing inks and paints are mentioned.

Other mixtures of pigments based on PY 74 have been described, in particular in the document GB 1 348 509 A (mixtures derived from a diazo compound and 0.5 to 20% of one or two polar couplers) and in the document FR 2226440 A (derivatives of 4-nitro-aniline).

In the document FR 2275533, PY 74 is treated with salts of alkylamines or aralkylamines and colophanes, in order to improve the stability of transparency when hot, dispersibility and rheology. The PY 74 can optionally be tinted using components intended to obtain a redder shade.

Finally, in document EP 0012944 A, the objective is to increase the stability on recrystallization by using mixtures of pigments derived from several amines or couplers, 1 to 20% of which contain acid groups which are then subjected to treatment with quaternary cationic compounds.

Other documents report improvements on mono-azo pigments obtained by tinting (coprecipitation on synthesis).

The document Database WPI, Section Ch, Week 7604, Derwent Publications Ltd., London, GB; Class E24, AN 76-06814X, XP002057434 & SU 405 382 A claims a pigment of high quality obtained by diazotizing of a mixture based on 4-chloro-2-nitroaniline and coupling with acetylaceto-m-xylidide.

The document U.S. Pat. No. 3,446,640 A mentions transparent and stable pigments obtained by diazotizing of 4-chloro-2-nitroaniline and coupling with a mixture of acetylacetanilide and acetylaceto-m-xylidide.

Finally, the document "An investigation in the synergism of monoazoacetoacetanilide pigments", Liu Dongzhi et al., Dyes and Pigments, 18, no. 1, Jan. 1, 1992, pp. 69–80, indicates that when there is synergy, pigments with improved colouring power and transparency are obtained, combined with primary crystals of smaller size.

In printing inks, the product which is most transparent and has the greatest colouring power is generally preferred.

Document EP 0079303 A mentioned above indicates the modifications to the process which allow the transparent form or the opaque form to be obtained.

In fact, it is possible to obtain all the variants of the product, from the most transparent to the most opaque, by modifying the process parameters, the main point being the intensity of heating (temperature and duration) after coupling: when the heating is increased, transparency and colouring power decrease, as does the gloss of the ink.

However, other characteristics are correlated to the same properties, which limit the possibilities. It is generally accepted that the flow properties (rheology) of the pigmented ink quite particularly become worse and worse as the colouring power and transparency increase. This is particularly unsatisfactory for the production of concentrated inks (with a high pigment content).

The purpose of the present invention is to provide compositions based on PY 74 allowing a practical optimum level to be obtained which is superior to current products, while reconciling properties which are a priori contradictory:

power and transparency on the one hand, good flow properties on the other hand.

Characteristic Elements of the Invention

It has been found that pigmentary compositions for inks are obtained which are superior to current products by coupling a mixture of diazonium salts obtained from 98 to 85% in moles of 2-methoxy-4-nitro-aniline and 2 to 15% in moles of 4-chloro-2-nitro-aniline and preferably from 95 to 88% in moles of 2-methoxy-4-nitro-aniline and 5 to 12% in moles of 4-chloro-2-nitro-aniline with acetylaceto-2-anisidide.

This pigmentary composition allows a better compromise to be achieved, i.e. a better rheology for a given transparency, or a better transparency and power for the same rheology, or any other intermediate solution by modifying the heating conditions for the formation of the pigment after coupling. The compositions according to the invention also offer the advantage of having colour characteristics (tint, purity) practically identical to those of pure PY 74, unlike other tinting mixtures already available.

The pigmentary compositions obtained lend themselves to standard pigment treatment techniques already known, such as the addition of resins, surfactants, etc.

They also allow, if desired, the adoption of standard modification and tinting operations.

The composition can be obtained by diazotizing of a mixture of amines constituted by 98 to 85% in moles of 2-methoxy-4-nitro-aniline and 2 to 15% in moles of 4-chloro-2-nitro-aniline and coupling with acetylaceto-2-anisidide or also by separate diazotizing of 2-methoxy-4-nitro-aniline and 4-chloro-2-nitro-aniline, mixture of the two diazonium salts obtained at a rate of 98 to 85% in moles for the 2-methoxy-4-nitro-aniline derivative and 2 to 15% in moles for the 4-chloro-2-nitro-aniline derivative and simultaneous coupling with acetylaceto-2-anisidide.

The pigmentary compositions are suitable for producing printing inks or also for producing a pigmentary concentrate intended for the production of printing ink.

EXAMPLES

The following examples illustrate the present invention. The percentages are by weight, unless otherwise indicated.

With each of these products, an 18% pigment concentrate is produced by grinding in a varnish constituted in the following manner:

| | |
|---|---|
| nitrocellulose type CA4 A20 (SS 1/4s): | 14.6% |
| dioctyl phthalate: | 3.0% |
| ethyl acetate: | 26.4% |
| ethanol: | 45.3% |
| Dowanol ® PB 40: | 7.3% |
| (propylene glycol ether produced by the firm Dow Chemical) | |
| n-propanol: | 3.4% |
| | 100.0% |

The rheology of the concentrate is measured at 25° C. using a cone and plate viscosimeter. Table 1 shows the viscosity measured for three different levels of shearing: 22, 43 and 200 $s^{-1}$.

Inks with 8% pigment are then produced by dilution with the same varnish, and these inks are applied to black stripe paper using a motorized spiral type coater of the Hand Coater No. 2 type from the firm "RK Print Coat Instruments Ltd.", i.e. with a wet thickness of 12 µm.

Graduated tone applications are also carried out with a ratio of 1 part of pigment for 10 parts of titanium dioxide and an application is made on paper under the same conditions.

The colour characteristics are measured in full and graduated tone using a spectrophotocolorimeter and calculated using the L,A,B system with the pigment of Example 1 as a reference. The transparency is graded by visual evaluation on the black stripe, also with respect to Example 1.

Table 1 indicates for each pigment the colour ($\Delta H$) in full and graduated tone, the transparency, the colouring power and the rheology of the 18% concentrates.

Example 1 (reference—pure PY 74)

75.6 g of 5-nitro-2-amino-anisole is impasted carefully with 145 g of 32% hydrochloric acid and 200 g of water in order to form the hydrochloride. The reaction medium is cooled down with ice and diazotized at 0–5° C. with 80 g of a 40% sodium nitrite solution. The reaction medium is maintained in the presence of an excess of nitrite at 5–7° C. for two hours, then the solution is filtered and the nitrous excess is removed using amidosulphonic acid.

99.2 g of acetylaceto-o-anisidide is dissolved in 560 g of water and 21.3 g of sodium hydroxide and this solution is added to a solution of 11.25 g of an ethoxylated derivative of N-alkyl propylene diamine (Dinoramox S12 from the firm CECA) in 850 g of water at 20° C. The coupler is then reprecipitated with a solution of 32.67 g of acetic acid in 250 g of water and the coupling is carried out by adding the diazonium salt solution over one hour. During the coupling, the pH decreases and when it reaches 4.2, a 10% solution of sodium hydroxide is added in order to maintain it at 4.2.

Once the coupling has been carried out, a solution of 11.57 g of colophane dissolved in 115 ml of water with 1.27 g of sodium hydroxide is added.

The reaction medium is heated to 80° C. then maintained at this temperature for one hour. The pigment is filtered and washed, then dried in a laboratory oven at 70° C. and ground.

Example 2 (reference more transparent pure PY 74)

The process is carried out as in Example 1, but after heating to 80° C., the reaction medium is filtered immediately without waiting.

The pigment obtained is more transparent than that of Example 1, but its rheological properties are inferior (cf. Table 1).

Example 3 (according to the invention)

The process is carried out as in Example 1, but replacing the 75.6 g of 5-nitro-2-amino-anisole with 69.55 g of 5-nitro-2-amino-anisole and 6.21 g of 4-chloro-2-nitro-aniline.

The pigment obtained has better flow properties than that of Example 1 and its colouring power and transparency are superior: they are even superior to those of Example 2. Its colour characteristics are very close (cf. Table 1).

Example 4 (tinting with Pigment Yellow 65)

The process is carried out as in Example 3, but replacing the 6.21 g of 4-chloro-2-nitro-aniline with 6.05 g of 3-nitro-4-amino-anisole (cf. document FR 2 394 584 A).

The product obtained is transparent, has Theological properties which are inferior to those of Example 1, and its tint is much redder (cf. Table 1).

TABLE 1

| Example no. | Full tone ΔH | Transparency | Graduated tone ΔH | Colouring power | 18% concentrate: viscosity in mPa·s D = 22 s⁻¹ | D = 43 s⁻¹ | D = 200 s⁻¹ |
|---|---|---|---|---|---|---|---|
| 1 | 0 | 0 | 0 | 100% | 4.4 | 2.5 | 0.95 |
| 2 | 0.54 | +2 | 0.45 | 103.6% | 4.44 | 2.64 | 1.56 |
| 3 | −0.11 | +4 | 0.30 | 104.3% | 3.10 | 1.16 | 0.51 |
| 4 | −2.63 | +5 | −2.17 | 102.1% | 4.61 | 2.71 | 1.45 |

What is claimed is:

1. Transparent pigmentary composition for inks obtained by coupling a mixture of diazonium salts obtained from 98 to 85% in moles of 2-methoxy-4-nitro-aniline and 2 to 15% in moles of 4-chloro-2-nitro-aniline with acetylaceto-2-anisidide.

2. Composition according to claim 1, wherein the mixture of diazonium salts contains from 95 to 88% in moles of 2-methoxy-4-nitro-aniline and from 5 to 12% in moles of 4-chloro-2-nitro-aniline.

3. Composition according to claim 1, wherein the composition essentially maintains the actual color of Pigment Yellow 74, while forming a pigmentary composition for inks of high coloring power and transparency, while maintaining good flow properties.

4. Preparation process for a transparent pigmentary composition for inks wherein the mixture of amines constituted by 98 to 85% in moles of 2-methoxy-4-nitro-aniline and by 2 to 15% in moles of 4-chloro-2-nitro-aniline is diazotized and coupled with acetylaceto-2-anisidide.

5. Process according to claim 4, wherein the mixture of amines constituted by 95 to 88% in moles of a 2-methoxy-4-nitro-aniline and by 5 to 12% in moles of 4-chloro-2-nitro-aniline is diazotized and coupled with acetylaceto-2-anisidide.

6. Preparation process for a transparent pigmentary composition for inks, comprising diazotizing separately 2-methoxy-4-nitro-aniline and 4-chloro-2-nitro-aniline in that the two diazonium salts obtained are mixed in a ratio of 98 to 85% in moles for the derivative of 2-methoxy-4-nitro-aniline in moles for the derivative of 4-chloro-2-nitro-aniline followed by simultaneous coupling with acetylaceto-2-anisidide.

7. A printing ink comprising pigmentary composition of claim 1.

8. A pigmentary concentrate for the production of a printing ink comprising the pigmentary composition of claim 1.

9. Composition according to claim 2, wherein the composition essentially maintains the actual color of Pigment Yellow 74, while forming a pigmentary composition for inks of high coloring power and transparency, while maintaining good flow properties.

10. A printing ink comprising the pigmentary composition of claim 2.

11. A pigmentary concentrate for the production of a printing ink comprising the pigmentary composition of claim 2.

12. A printing ink comprising the pigmentary composition of claim 3.

13. A pigmentary concentrate for the production of a printing ink comprising the pigmentary composition of claim 3.

* * * * *